Oct. 6, 1964    M. C. BURK    3,152,301
ELECTRICAL MEASURING APPARATUS
Filed Sept. 22, 1961    2 Sheets-Sheet 1

INVENTOR.
M. C. BURK
BY
Hudson & Young
ATTORNEYS

Oct. 6, 1964           M. C. BURK           3,152,301

ELECTRICAL MEASURING APPARATUS

Filed Sept. 22, 1961           2 Sheets-Sheet 2

INVENTOR.
M. C. BURK

BY

Hudson & Young

ATTORNEYS

United States Patent Office 3,152,301
Patented Oct. 6, 1964

3,152,301
ELECTRICAL MEASURING APPARATUS
Marvin C. Burk, Bartlesville, Okla., assignor to Phillips Petroleum Company, a corporation of Delaware
Filed Sept. 22, 1961, Ser. No. 140,106
8 Claims. (Cl. 323—75)

This invention relates to electrical measuring apparatus. In one specific aspect it relates to apparatus for balancing electrical bridge networks. In another specific aspect it relates to the measurement of a plurality of signals in sequence.

It is common practice in the electrical measuring art to utilize bridge networks which contain at least one impedance element that is representative of a condition to be measured. In chromatographic analyzers, for example, thermistors are usually disposed in the carrier gas supply and in the column effluent, respectively. A comparison of the temperatures sensed by these elements provides an indication of the appearance of constituents of the sample in the column effluent. This comparison of temperatures can readily be made by positioning the two thermistors in adjacent arms of an electrical bridge network. The resulting electrical unbalance of the network is thus indicative of the temperature difference between the two thermistors. Similar bridge networks are commonly employed in other types of analyzers, such as optical analyzers wherein radiation sensitive impedance elements compare the amounts of radiation in two beams.

Electrical bridge networks of this type and the associated detecting circuits are often plagued by drift over periods of time. This can result from aging of circuit components, changes in power supplies, or from a number of other factors. In order to overcome this drift problem, various schemes have been designed to rebalance the bridge networks periodically. This is usually accomplished by means of a servo system which employs a reversible motor to adjust an impedance in the bridge network. While these systems are satisfactory for many purposes, they are somewhat expensive to construct and require relatively long periods of time to rebalance the bridge network.

In accordance with another aspect of this invention, the same type of integrating circuit is utilized to provide a plurality of output signals in sequence which represent the values of a plurality of signals to be measured. This circuit is particularly useful in conjunction with chromatographic analyzers wherein it is desired to measure the concentration of a plurality of components in sequence.

Accordingly, it is an object of this invention to provide apparatus for balancing electrical bridge networks.

Another object is to provide a detecting circuit to measure a plurality of signals in sequence.

Other objects, advantages and features of the invention should become apparent from the following detailed description, taken in conjunction with the accompanying drawing in which.

Figure 1:
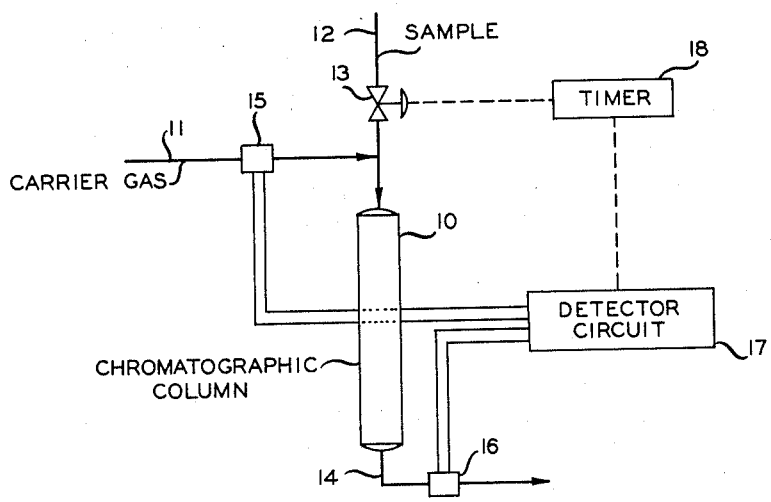
FIGURE 1 is a schematic representation of a chromatographic analyzer having the detector circuit of this invention incorporated therein.

Referring now to the drawing in detail and to FIGURE 1 in particular, a conventional chromatographic analyzer is illustrated. This analyzer comprises a column 10 which is filled with a packing material that selectively retards passage therethrough of the constituents of a fluid sample to be analyzed. A carrier gas is introduced into the inlet of column 10 from a conduit 11. A sample conduit 12, having a control valve 13 therein, communicates with conduit 11 near the inlet of column 10. Effluent is removed from column 10 through a conduit 14. First and second detectors 15 and 16, which advantageously are thermistors, are positioned in respective conduits 11 and 14. These two thermistors are connected into a detector circuit 17 which is described hereinafter in detail.

In normal operation of the analyzer of FIGURE 1, carrier gas initially flows through column 10 to purge any sample constituents that may remain from a previous analysis. Valve 13 is then opened momentarily by means of a timer 18 to introduce a predetermined volume of sample into column 10. Although illustrated schematically, valve 13 can be any type of sample valve known in the chromatographic art for introducing preselected volumes of material. The carrier gas tends to force the components of the sample through column 10 at different rates which depend upon the affinity of the packing material for the individual components. Thus, the individual components of the sample appear in sequence in the column effluent. These components are measured by detector circuit 17.

Figure 2:
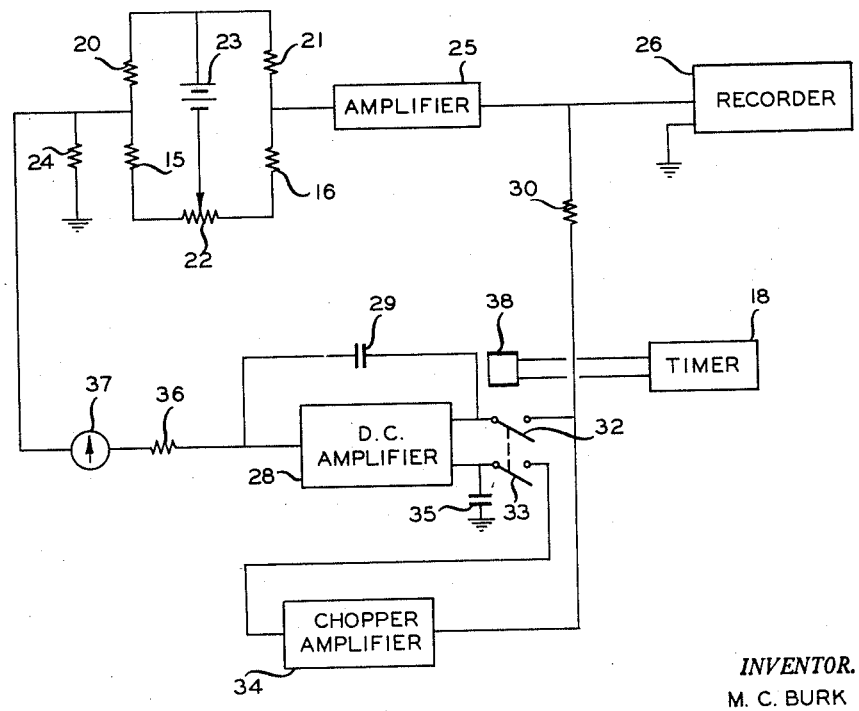
FIGURE 2 is a schematic circuit drawing of the bridge balancing network of this invention.

Detector circuit 17 is illustrated schematically in FIGURE 2. Thermistors 15 and 16 constitute two arms of a bridge network. Resistors 20 and 21 are connected in series relationship between corresponding first terminals of thermistors 15 and 16. A potentiometer 22 is connected between the second terminals of thermistors 15 and 16. One terminal of a direct current voltage source 23 is connected to the junction between resistors 20 and 21. The second terminal of voltage source 23 is connected to the contactor of potentiometer 22. A resistor 24 is connected between ground and the junction between thermistor 15 and resistor 20. The junction between thermistor 16 and resistor 21 is connected to the input of an amplifier 25. The output of amplifier 25 is connected to the input of a recorder 26.

The bridge network is initially balanced when carrier gas is flowing past thermistors 15 and 16. This is accomplished by adjusting the contactor of potentiometer 22 until a zero or other predetermined reference signal is applied to recorder 26. When the temperature of thermistor 16 subsequently changes, with respect to the temperature of thermistor 15, the bridge becomes unbalanced and a signal is applied to recorder 26. This is a conventional bridge detector circuit. Amplifier 25 increases the unbalance signal to a desired value. In many applications, this amplifier circuit can include an attenuating network actuated by timer 18 to permit the the sequential signals to be amplified by preselected amounts.

As previously mentioned, it is desirable to rebalance the bridge network automatically at predetermined intervals to compensate for any drift that may take place in the bridge or an amplifier 25. This is accomplished by means of a direct current amplifier 28 and the circuit elements associated therewith. Amplifier 28 is provided with a differential input circuit so that the input signal thereto is the difference between the signals applied to the two input terminals. A capacitor 29 is connected between the output of amplifier 28 and the first input terminal thereof. This first input terminal of amplifier 28 is connected by means of a switch 32 and a resistor 30 to the output of amplifier 25. The second input terminal of amplifier 28 is connected by a switch 33 to the output of a chopper amplifier 34. The input of chopper amplifier 34 is connected to resistor 30. A capacitor 35 is connected between the second input terminal of amplifier 28 and ground. The output of amplifier 28 is connected by a resistor 36 and a current indicating meter 37 to the junction between thermistor 15 and resistor 20.

When it is desired to rebalance the bridge network, a signal from timer 18 is applied to a relay coil 38 which closes switches 32 and 33. This can occur, for example, at the end of a complete analysis or between the appearances of the individual sample components in the column effluent. When switches 32 and 33 are closed, resistor 30 and capacitor 29, in conjunction with amplifier 28, form an integrator. The chopper amplifier 34 provides stabilization for the D.C. amplifier of the integrator. It is initially assumed that the output from amplifier 28 is zero and the detector circuit is unbalanced. Closure of switches 32 and 33 results in the output signal from amplifier 25 being integrated to establish a voltage in the output of amplifier 28. This voltage causes a current to flow through resistors 36 and 24 to ground. This current flows until voltage drop across resistor 24 is equal to the unbalance of the bridge network. When this condition exists, the output signal of amplifier 25 returns to zero and the integrator output remains constant. Relay coil 38 is then deenergized by timer 18 to open switches 32 and 33. However, the output of the integrator remains constant until the next rebalancing operation due to the charge stored on capacitor 29. The output signal from the chopper amplifier is stored on capacitor 35.

Figure 3:
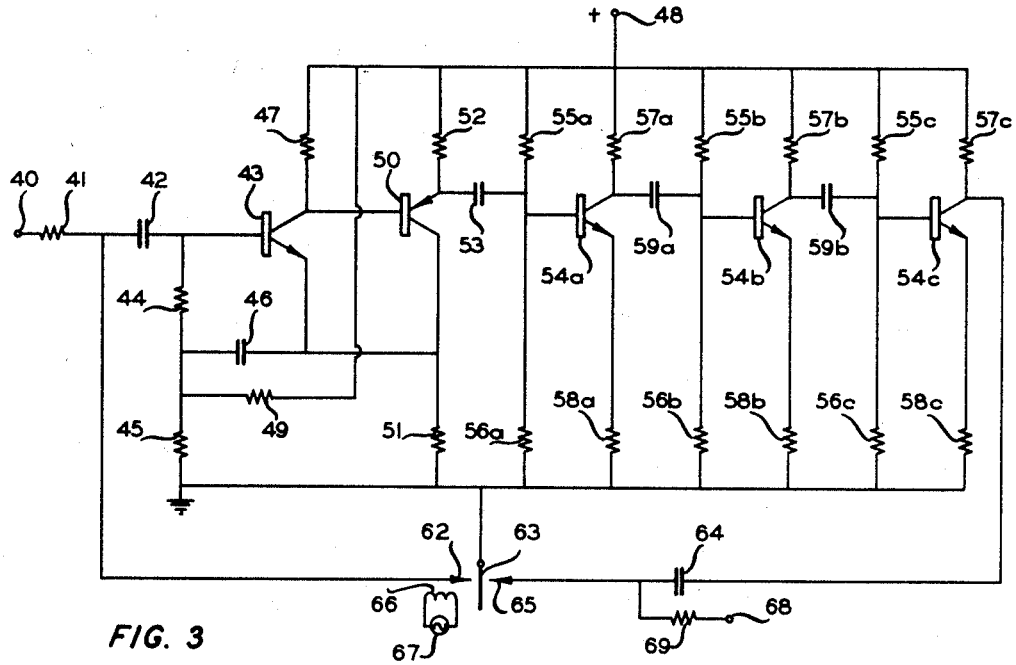
FIGURE 3 is a schematic circuit drawing of the chopper amplifier employed in the apparatus of FIGURE 2.

A suitable chopper amplifier for use in the circuit of FIGURE 2 is illustrated schematically in FIGURE 3. Input terminal 40 is connected by means of a resistor 41 and a capacitor 42 to the base of a first transistor 43. The base of transistor 43 is connected to ground through series connected resistors 44 and 45. The emitter of transistor 43 is connected by means of a capacitor 46 to the junction between resistors 44 and 45. The collector of transistor 43 is connected by means of a resistor 47 to a terminal 48 that is maintained at a positive potential. The emitter and collector of transistor 43 are also connected to the collector and to the base, respectively, of a second transistor 50. The collector of transistor 50 is connected to ground by means of a resistor 51, and the emitter of transistor 50 is connected by means of a resistor 52 to terminal 48. The emitter of transistor 50 is also connected by means of a capacitor 53 to the base of a third transistor 54a. The base of transistor 54a is connected to terminal 48 by means of resistor 55a and to ground by means of a resistor 56a. The collector of transistor 54a is connected to terminal 48 by means of a resistor 57a, and the emitter of transistor 54a is connected to ground by means of a resistor 58a. The collector of transistor 54a is connected by means of a capacitor 59a to the base of a fourth transistor 54b. Transistor 54b and a fifth transistor 54c perform additional stages of amplification which are similar to the one previously described and wherein corresponding elements are designated by similar b and c reference characters.

The junction between resistor 41 and capacitor 42 is connected to a first stationary terminal 62 which is adapted to be engaged periodically by a switch 63. The collector of transistor 54c is connected by means of a capacitor 64 to a second terminal 65 which is also engaged periodically by switch 63. Switch 63 moves between terminals 62 and 65 when a coil 66 is energized from an alternating current source 67. Terminal 65 is connected to the output terminal 68 of amplifier 34 by means of a resistor 69.

It can thus be seen that the input signal to the amplifier is periodically shorted to ground when switch 63 engages terminal 62. This converts the input direct current signal into an alternating signal which is amplified by the five transistor stages. The output alternating signal is reconverted to a unidirectional signal due to terminal 65 being grounded periodically when engaged by switch 63. In this manner, the chopper amplifier provides the stability of an alternating current amplifier to reduce direct current drift in the integrator formed by D.C. amplifier 28.

Figure 4:
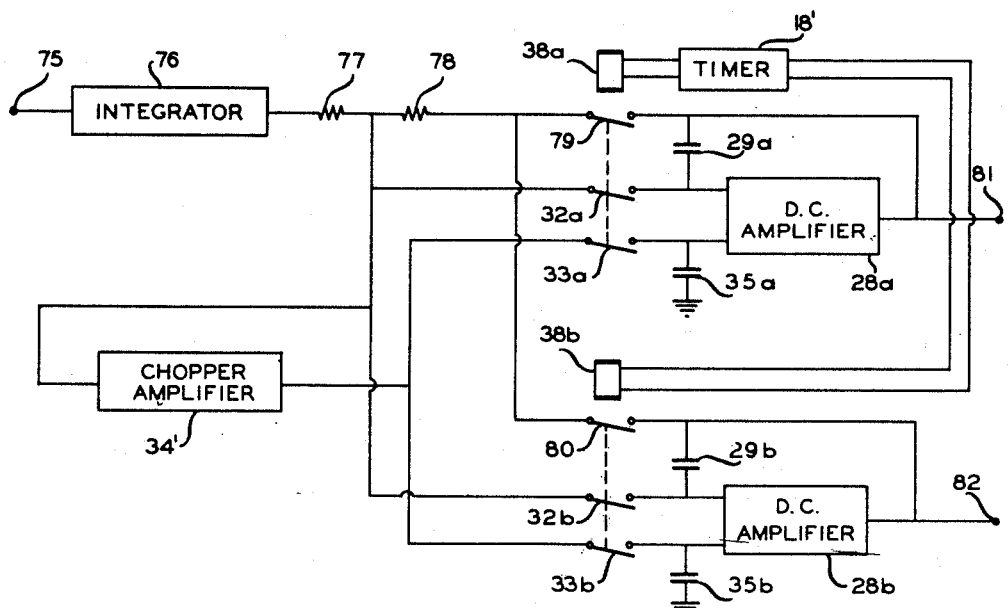
FIGURE 4 is a schematic circuit drawing of a signal measuring embodiment of this invention.

In making analyses by chromatography, it is often desirable to provide a plurality of output signals which represent the integrated or peak values of the bridge unbalance signals, these values being representative of the concentrations of the individual components of the sample being analyzed. This can readily be accomplished by means of the apparatus illustrated in FIGURE 4. An input terminal 75 is connected to the input of a conventional integrator circuit 76. Terminal 75 can represent the output of amplifier 25 of FIGURE 2, for example. The output of integrator 76 is connected through series resistors 77 and 78 to respective switches 79 and 80. Switches 79 and 80 are closed when respective relay coils 38a and 38b are energized so as to apply the output of integrator 76 to respective output terminals 81 and 82. The junction between resistors 77 and 78 is connected to the input of chopper amplifier 34' and to respective switches 32a and 32b. The output of chopper amplifier 34' is connected to respective switches 33a and 33b.

As previously mentioned, the individual components of the sample appear in sequence in the effluent from column 10. These components unbalance the bridge circuit of FIGURE 2 and the resulting output signal is integrated by circuit 76. Timer 18' is adjusted to energize relay coil 38a when the first component of interest appears in the column effluent. This applies the output of integrator 76 directly to terminal 81, which can be connected to a recorder or to apparatus to be controlled in response to the analysis. The integrating circuit formed by amplifier 28a stores a signal on capacitor 29a representative of this peak value. This signal remains after relay coil 38a is deenergized. This is particularly useful when the signal at terminal 81 is employed for control purposes. In a similar manner, timer 18' energizes relay coil 38b at a later time to apply the signal representing the second component of interest to output terminal 82. This signal is subsequently stored on capacitor 29b in the manner previously described.

In view of the foregoing description it can be seen that improved electrical measuring apparatus is provided in accordance with this invention. While the invention has been described in conjunction with presently preferred embodiments, it is obvious that it is not limited thereto.

What is claimed is:

1. Measuring apparatus comprising a direct current electrical bridge network having at least one element therein which is representative of a condition to be measured, means connected to said bridge network to establish an output signal representative of unbalance of said network, signal storage means, signal integrating means, means to apply said output signal to said storage means periodically and to apply the difference between said output signal and the signal stored on said storage means to the input of said integrating means at such times, and means to apply the output of said integrating means to said bridge network to rebalance same.

2. Measuring apparatus comprising a direct current electrical bridge network having at least one element therein which is representative of a condition to be measured, means connected to said bridge network to establish an output signal representative of unbalance of said network, a differential direct current amplifier having first and second input terminals, a feedback capacitor connected between the output of said amplifier and said first input terminal, a signal storage means connected to said second input terminal, a resistor having the first terminal thereof connected to the output of said means to establish, means to connect the second terminal of said resistor to the first input terminal of said amplifier periodically, means connected to the second terminal of said resistor to produce a stabilized signal responsive to the signal appearing at the second terminal of said resistor and to apply said stabilized signal to said second input terminal of said amplifier, and means to apply the output of said amplifier to said bridge network to rebalance same.

3. The apparatus of claim 2 wherein said means to connect the second terminal of said resistor to said second input terminal comprises a stabilizing amplifier having a signal chopper in the input thereof to convert the input signal to an alternating signal and a signal chopper to convert the amplified alternating signal back to a direct signal.

4. Measuring apparatus comprising a direct current electrical bridge network having at least one element therein which is representative of a condition to be measured, means connected to said bridge network to establish an output signal representative of unbalance of said network, a differential direct current amplifier having first and second input terminals, a feedback capacitor connected between the output of said amplifier and said first input terminal, a signal storage means connected to said second input terminal, a resistor having the first terminal thereof connected to the output of said means to establish, a first switch to connect said first input terminal to the second terminal of said resistor, a stabilizing amplifier having the input thereof connected to the second terminal of said resistor, a second switch to connect said second input terminal to the output of said stabilizing amplifier, timing means to close said first and second switches simultaneously and periodically for selected time intervals, and means to apply the output of said direct current amplifier to said bridge network to rebalance same.

5. Measuring apparatus comprising a direct current electrical bridge network having at least one element therein which is representative of a condition to be measured, means connected to said bridge network to establish an output signal representative of unbalance of said network, signal storage means, signal integrating means, and means to apply said output signal to said storage means periodically and to apply the difference between said output signal and the signal stored on said storage means to the input of said integrating means at such times.

6. Measuring apparatus comprising a direct current electrical bridge network having at least one element therein which is representative of a condition to be measured, means connected to said bridge network to establish an output signal representative of unbalance of said network, a differential direct current amplifier having first and second input terminals, a feedback capacitor connected between the output of said amplifier and said first input terminal, a signal storage means connected to said second input terminal, a resistor having the first terminal thereof connected to the output of said means to establish, means to connect the second terminal of said resistor to the first input terminal of said amplifier periodically, and means connected to the second terminal of said resistor to produce a stabilized signal responsive to the signal appearing at the second terminal of said resistor and to apply said stabilized signal to said second input terminal of said amplifier.

7. Measuring apparatus comprising a direct current electrical bridge network having at least one element therein which is representative of a condition to be measured, means connected to said bridge network to establish an output signal representative of unbalance of said network, first and second differential direct current amplifiers, each having first and second input terminals and an output terminal; first and second feedback capacitors connected between the output terminals and the first input terminals of said first and second amplifiers, respectively; first and second signal storage means connected to the second terminals of said first and second amplifiers, respectively; a stabilizing amplifier having the input thereof connected to the output of said means to establish; means to apply the output of said means to establish to the input of said stabilizing amplifier; means to apply the output of said means to establish periodically to the first input terminal and the output terminal of said first amplifier, and to apply the output of said stabilizing amplifier to the second input terminal of said first amplifier; and means to apply the output of said means to establish periodically to the first input terminal and the output terminal of said second amplifier, and to apply the output of said stabilizing amplifier to the second input terminal of said second amplifier.

8. Measuring apparatus comprising a differential direct current amplifier having first and second input terminals and an output terminal, a signal storage means connected to said second input terminal, a capacitor connected between said output terminal and said first input terminal, a stabilizing alternating current amplifier having an input circuit and an output circuit, said input circuit comprising an input terminal and a signal chopper, said output circuit comprising a signal chopper and an output terminal, and switching means to connect the input terminal of said input circuit and the output terminal of said output circuit to said first and second input terminals, respectively.

References Cited in the file of this patent

UNITED STATES PATENTS

| | | |
|---|---|---|
| 2,790,036 | Tongue | Apr. 23, 1957 |
| 2,833,469 | Groth | May 6, 1958 |
| 2,866,018 | Bell | Dec. 23, 1958 |